May 30, 1944.  C. F. BLACK  2,349,809
CLAMP
Filed Aug. 12, 1943
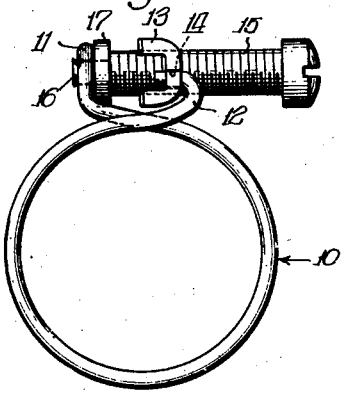
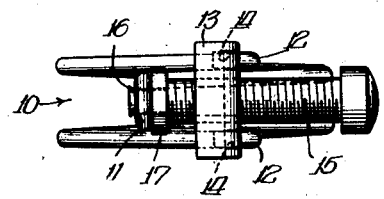
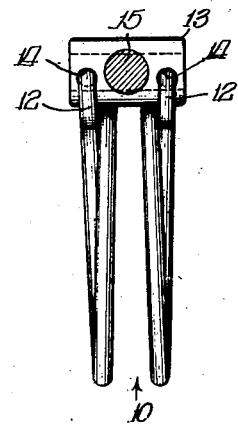
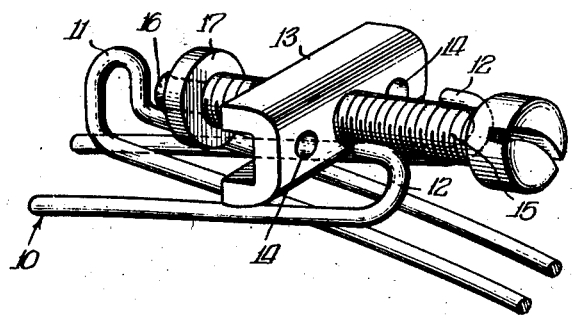
INVENTOR.
Charles F. Black,
BY
Cromwell, Greist + Warden
attys Patented May 30, 1944

2,349,809

UNITED STATES PATENT OFFICE 2,349,809

CLAMP

Charles F. Black, Chicago, Ill., assignor, by mesne assignments, to Central Equipment Co., Chicago, Ill., a corporation of Illinois Application August 12, 1943, Serial No. 498,281

8 Claims. (Cl. 24—19)

The present invention relates to clamps. More particularly, it pertains to hose clamps where considerable mechanical strength is required to withstand stresses and strains encountered in machines, such as, for example, military and naval combat airplanes, armored land tanks, and the like.

A general object of the invention is the provision of a hose clamp which is economical of manufacture, simple yet sturdy and durable of construction, which will operate with freedom from mechanical difficulties and disadvantages, and which is otherwise well suited to the purposes for which it is intended.

A principal object of the present invention is the provision of a hose clamp in which the tightening element or screw imparts a pushing action to give a complete circular grip to the band member of the clamp by having the thrust of the screw actuated in the direction of the pull of the band end which it engages and in a direction opposite from the other band end.

Another principal object of the present invention is the provision of a hose clamping device which has a utility range equal to its inside diameter when supplemented by a screw threaded element of at least an equivalent effective threaded area to open or close the clamp an equal distance.

Another object of the invention is the provision of a clamping device which has circular clampability completely to equalize the action of the clamp throughout its entire inner circumference whereby maximum efficiency of gripping action is attained.

A further object of the invention is the provision of such a clamp wherein there are obtained the benefits of a swivel action and the corresponding functions thereof without the use of swivel joints by the utilization of a swivel nut which combines the chief advantages of a swivel pin and a locking and tightening element.

Still another object of the invention is the provision of a hose clamping device which is easy to assemble and disassemble without disconnecting the hose line, which does not have to be slipped off the hose which it is intended to secure in sealed position, and which, when the tightening and locking elements are removed as a unit, permits the circular clamping member to be removed with very little distortion by expanding the same between the ends a distance no greater than the diameter of the band.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which:

Fig. 1 is a side elevational view of a completely assembled hose clamp illustrating a preferred form of the invention;

Fig. 2 is a top view of Fig. 1;

Fig. 3 is one end elevational view of the clamp shown in Fig. 1;

Fig. 4 is an opposite end elevational view; and

Fig. 5 is an enlarged perspective view of the upper portion of the clamp in the preceding figures illustrating the disengageable relationship of the locking element and band member and its ends.

Referring more particularly to the drawing there is shown a circular band member 10, preferably in the form of a single wire of suitable gauge which is bent double upon itself to provide two laterally spaced constricting portions. The U-shaped loop at the location of the bend is turned outwardly to provide a socket member 11 at that end of the band. At the other end of the band two hook members 12 are formed on the laterally spaced extremities of the wire.

A screw threaded locking element 13 which is C-shaped in cross section is mounted in overlying position between the ends of the band as defined by the socket member 11 and hooks 12. In the web portion of the element 13 are holes 14 which receive the hooks 12. The locking member 13 is screw threaded and carries a screw element 15. The end of the screw has a reduced portion 16 on which a washer 17 is mounted. The socket member 11 is adapted to engage the portion 16 of the screw in end thrust engagement with the washer 17. It will be observed that the locking member 13 of itself performs a double function. One of these is the action of a nut and the other the action of a swivel head. Hence, this element may appropriately be designated a "swivel-nut." The swivel action takes place by virtue of the hinge-like connections between the hooks 12 and the ends of the member 13, which connections are equidistant from the screw 15, at opposite sides of the latter, and are preferably free to adjust themselves to equalize the stresses in both strands as the clamp is drawn up tight on the hose or other member.

In operation the band 10 is slipped over a hose or other member which is to be secured in position. The ends of the clamping member 10 need not be opened or separated any more than the diameter of the hose, which obviously will be no greater than the diameter of the circular band itself. The hook members 12 come to rest in the holes 14 of the member 13 when it is placed between the ends of the band.

When it is desired to fasten the clamp in position, the screw is turned and—contrary to conventional practice which seeks to draw the band tighter by having the ends of the clamp drawn closer together—the ends of the band are spread farther apart and in directly opposite directions because of the thrust of the screw urging the looped end 11, where it comes against the shoulder 17, farther away from the end carrying the hooks 12. This latter end is forced or held in position by the locking element 13 as the screw is continually tightened and the band made smaller.

There are no stresses or strains set up in the entire arrangement whereby the screw can be moved or pulled out of alignment to be bent or broken, because the stress equalizing hook connections will prevent this, with the result that the direction of thrust of the screw is maintained substantially constant. A particular advantage of this arrangement is the fact that breakage is virtually eliminated because there is no pulling apart of the screw element, the combined action being one of compressibility of the screw itself. In addition to the elimination of undesirable stresses and strains by this swivel-like action, which takes the place of a special swivel pin in conventional constructions, the element 13 also acts as a locking nut as well as a central station around which all of the clamping action hinges. It will be seen that if the screw is of sufficient length the band can continuously be tightened until its diameter has been reduced to a point where even the smallest of pipes or hose diameters can be accommodated.

The swivel-nut 13 and screw 15 can, when backed up to the end of the thread, readily be lifted out of engagement with the ends of the clamping members of the band as a complete unit, and the band itself readily removed from its position without disconnecting the hose to which it is applied.

It will thus be seen that the objects hereinbefore set forth may readily and efficiently be attained, and since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A hose clamp, which comprises a circular band member having ends which movably extend beyond each other in opposite directions, one of the ends of said member terminating in a socket and the other end thereof terminating in hooks, a screw threaded locking element overlying and disposed between the ends of said band member and engaging said hooks, said locking element carrying a screw, one end of which is engaged by said socket member to receive the thrust of said screw in tightening said band by pushing said ends farther apart in said opposite directions.

2. A hose clamp, which comprises a circular band member having ends which cross each other in opposite directions, said band consisting of a single strand of wire having a loop forming a socket member at one of said ends and hooks terminating the other of said ends, a screw threaded locking nut overlying and disposed intermediate the ends of said band member being engaged by said hooks, said locking nut carrying a screw, one end of which is engaged by said socket member to receive the thrust of said screw in tightening said band by pushing said ends farther apart in said opposite directions.

3. A hose clamp, which comprises a circular band member consisting of spaced apart wires having ends which are actuatable beyond each other in opposite directions, one of the ends of said member terminating in a socket and the other end thereof consisting of the extremities of the wire terminating in two laterally spaced hooks, a screw threaded swivel nut carrying a screw and overlying the ends of said band therebetween and engaging said hooks at points equidistant from the screw, said swivel nut bearing against said band to compensate for take-up of pressure on said screw under increased tension, and said screw having one end thereof engaged by said socket member to receive the thrust thereof in tightening said band by pushing said ends farther apart in said opposite directions.

4. A hose clamp, which comprises a circular band member having ends which extend beyond each other in opposite directions, said band constituting a single piece of wire having a loop forming a socket member at one of said ends and two laterally spaced hooks terminating the other of said ends, a screw threaded swivel nut which is C-shaped in cross section overlying and disposed between the ends of said band member and engaging said hooks, said nut carrying a screw, one end of which is engaged by said socket member to receive the thrust of said screw in tightening said band by pushing said ends farther apart in opposite directions.

5. A hose clamp, which comprises a circular band member having ends which extend beyond each other in opposite directions, said band constituting a single piece of wire having a loop forming a socket member at one of said ends and two laterally spaced hooks terminating the other of said ends, a screw threaded swivel nut which is C-shaped in cross section overlying and disposed between the ends of said band member and engaging said hooks, said nut carrying a screw, one end of which is engaged by said socket member to receive the thrust of said screw in tightening said band by pushing said ends farther apart in opposite directions, said nut and screw being readily removable and replaceable as a unit from between the ends of said band member.

6. A clamp, comprising a banding element of circular form having overlapping portions terminating in spaced ends which are adapted to be forced farther apart tangentially of the banding element to constrict the latter, and a bolt and nut assembly for forcing the ends of the banding element farther apart, one of said ends being connected with a portion of the bolt and the other of said ends being connected with the nut, whereby relative rotation between the bolt and nut will act to constrict the banding element.

7. A clamp, comprising a single piece of wire which is bent double upon itself and curved to provide two laterally spaced generally circular portions, with the doubled end of the wire tangentially overlapping the two free ends of the wire in the space between the latter, said doubled end being shaped to provide an outwardly projecting eye, and said two free ends being shaped to provide two laterally spaced outwardly projecting hooks, a bolt having a reduced end portion disposed within the eye in rotatable association with the same, and a threaded crosshead screwed on the bolt in interlocked association adjacent its ends with the hooks on the free ends of the wire, said bolt upon being turned in the crosshead causing the two circular portions of the wire to be simultaneously constricted.

8. A clamp, comprising a single piece of wire which is bent double upon itself and curved to provide two laterally spaced generally circular portions, with the doubled end of the wire tangentially overlapping the two free ends of the wire in the space between the latter, said doubled end being shaped to provide an outwardly projecting eye, and said two free ends being shaped to provide two laterally spaced outwardly projecting hooks, a bolt having a reduced end portion disposed within the eye in rotatable association with the same, and a threaded crosshead screwed on the bolt in interlocked association adjacent its ends with the hooks on the free ends of the wire, said crosshead being held against rotation by the wire and said bolt upon being turned in the crosshead causing the two circular portions of the wire to be simultaneously constricted.

CHARLES F. BLACK.